United States Patent
Ramu et al.

(10) Patent No.: US 8,624,541 B2
(45) Date of Patent: Jan. 7, 2014

(54) SYSTEM AND METHOD FOR CONTROLLING FOUR-QUADRANT OPERATION OF A SWITCHED RELUCTANCE MOTOR DRIVE THROUGH A SINGLE CONTROLLABLE SWITCH

(75) Inventors: Krishnan Ramu, Blacksburg, VA (US); Keunsoo Ha, Seoul (KR); Sung-Yeul Park, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 10 days.

(21) Appl. No.: 13/460,911

(22) Filed: May 1, 2012

(65) Prior Publication Data

US 2013/0009589 A1 Jan. 10, 2013

Related U.S. Application Data

(62) Division of application No. 11/718,326, filed as application No. PCT/US2005/035423 on Oct. 3, 2005, now Pat. No. 8,203,302.

(60) Provisional application No. 60/614,547, filed on Oct. 1, 2004.

(51) Int. Cl.
H02P 1/46 (2006.01)
H02P 3/18 (2006.01)
H02P 6/00 (2006.01)

(52) U.S. Cl.
USPC ........ 318/701; 318/254.1; 318/258; 318/261; 318/703

(58) Field of Classification Search
USPC ................. 318/701, 703, 254.1, 258, 261
See application file for complete search history.

(56) References Cited

U.S. PATENT DOCUMENTS

| | | | |
|---|---|---|---|
| 4,500,824 A * | 2/1985 | Miller | 318/701 |
| 4,684,867 A | 8/1987 | Miller et al. | |
| 4,763,056 A | 8/1988 | Byrne et al. | |
| 4,812,728 A * | 3/1989 | Yang | 318/760 |
| 4,862,053 A * | 8/1989 | Jordan et al. | 318/786 |
| 5,075,610 A | 12/1991 | Harris | |
| 5,864,477 A | 1/1999 | Webster | |

(Continued)

OTHER PUBLICATIONS

International Search Report with Written Opinion issued Mar. 21, 2006 in counterpart International Application No. PCT/US2005/035423.

(Continued)

*Primary Examiner* — Erick Glass
(74) *Attorney, Agent, or Firm* — NSIP Law

(57) ABSTRACT

Regulating the speed of a two-phase switched reluctance machine (TPSRM) rotor includes selecting either a motoring mode or braking mode of operation for the TPSRM, regulating the rotor speed, when the motoring mode is selected, using a control signal cooperatively produced by a speed control feedback loop and a current control feedback loop; and regulating the rotor speed, when the braking mode is selected, using a control signal produced by the current control feedback loop without the cooperation of the speed control feedback loop. The speed control feedback loop uses an established speed control signal and a signal indicative of the rotor's speed to dynamically adjust a first parameter governing the control signal. The current control feedback loop uses an established current control signal and a signal indicative of the current flowing through a stator winding of the TPSRM to dynamically adjust a second parameter governing the control signal.

8 Claims, 16 Drawing Sheets

(56) References Cited

U.S. PATENT DOCUMENTS

| | | | |
|---|---|---|---|
| 5,900,712 | A | 5/1999 | Disser et al. |
| 6,181,092 | B1 | 1/2001 | Turner |
| 6,201,368 | B1 | 3/2001 | Webster |
| 7,590,334 | B2 * | 9/2009 | Yabusaki et al. ............ 388/811 |
| 7,747,146 | B2 * | 6/2010 | Milano et al. ................ 388/811 |

OTHER PUBLICATIONS

Krishnan Ramu, "Switched Reluctance Motor Drives," CRC Press, pp. 1-7, 2001.

* cited by examiner

SYSTEM AND METHOD FOR CONTROLLING FOUR-QUADRANT OPERATION OF A SWITCHED RELUCTANCE MOTOR DRIVE THROUGH A SINGLE CONTROLLABLE SWITCH

CROSS-REFERENCE TO RELATED APPLICATIONS

This application: (a) is a divisional application of U.S. patent application Ser. No. 11/718,326, filed Apr. 30, 2007 and having a 35 USC §371(c) date of Feb. 9, 2009, which is a national phase application of international application PCT/US2005/035423, filed Oct. 3, 2005, and claims priority to U.S. Provisional Application No. 60/614,547, filed Oct. 1, 2004, (b) claims the priority of these prior applications, and (c) incorporates by reference these prior applications in their entirety. Additionally, the application incorporates by reference the disclosures provided in Applicant's PCT International Application Nos. PCT/US03/16627, PCT/US03/16628, PCT/US03/16629, PCT/US03/16630, and PCT/US03/16631.

FIELD OF THE INVENTION

The present invention relates to a method and system for controlling the operation of a two-phase switched reluctance machine (TPSRM). More specifically, the invention relates to controlling the TPSRM with a power converter employing a single controllable switch.

BACKGROUND OF THE RELATED ART

A two-phase switched reluctance machine (TPSRM) is a switched reluctance machine (SRM) with two phases, phases A and B, displaced from each other by 180 degrees/n, where n is the number of stator poles per phase. FIGS. 7(a) and 7(b) illustrate a two-phase SRM 700 of the related art. TPSRM 700 has four stator poles 9-12 and two rotor poles 13, 14 and is characterized as a two-phase machine with a 4/2 stator/rotor pole combination (i.e., 4 stator poles and 2 rotor poles). The rotor rotates about a rotor shaft 15.

FIG. 7(a) illustrates TPSRM 700 and its flux paths through back iron segments 1-8, stator poles 9, 11, and rotor poles 13, 14 during the excitation of phase A. FIG. 7(b) illustrates TPSRM 700 and its flux paths through back iron segments 1-8, stator poles 10, 12, and rotor poles 13, 14 during the excitation of phase B. The phase A excitation is induced by winding 16, 16' around stator pole 9 and another winding 17, 17' on the diametrically opposed stator pole 11. Winding 16, 16' and winding 17, 17' may be connected in series or in parallel. The phase B excitation is induced by winding 18, 18' around stator pole 10 and another winding 19, 19' on the diametrically opposed stator pole 12. Winding 18, 18' and winding 19, 19' may similarly be connected in series or in parallel. In each of FIGS. 7(a) and 7(b), the rotor poles are positioned in alignment with the stator poles whose windings are being energized.

Excitation of the phase B windings is initiated when rotor pole 14 is positioned between stator poles 9 and 10 and rotor pole 13 is positioned between stator poles 11 and 12. The rate of change of inductance will be positive in this region and, hence, positive torque will be produced. As a result, rotor poles 14 and 13 will rotate clockwise (CW) toward the phase B stator poles 10 and 12, respectively. When rotor poles 14 and 13 pass around phase B stator poles 10 and 12, respectively, the phase A windings will be excited, causing rotor poles 14 and 13 to rotate CW toward the phase stator poles 11 and 9, respectively.

To reverse the direction of rotation, phase B windings 18, 18' and 19, 19' are excited when rotor pole 14 is between stator poles 12 and 9 and rotor pole 13 is between stator poles 10 and 11. If the rotor poles are closer to phase B stator poles 10 and 12, the rotor will rotate toward them resulting in counterclockwise (CCW) rotation. Therefore, controlling the rotor's direction of rotation involves the independent control of the phase A and B excitations. If such independent control of individual phase excitation is not possible, there is no control method that can reverse the machine's rotor rotation from one direction to another.

Related art TPSRMs are driven by two or four controllable switch-based power converters. Some examples are described below.

FIG. 1 illustrates a related art asymmetric power converter 100 for driving a two-phase SRM. Power converter 100 has two controllable and two uncontrollable power devices for each phase winding 101, 102 of the SRM. Therefore, four controllable 103-106 and four uncontrollable 107-110 power devices are required for power converter 100 to operate. The primary advantage of power converter 100 is that it gives full controllability in terms of its ability to apply full positive or negative direct current (dc) link voltage, and, therefore, it does not diminish or restrict any operating mode of the SRM. The disadvantage of this power converter topology is that it uses eight power devices. A more detailed description of power converter 100's circuit operation may be found in "Switched Reluctance Motor Drives", R. Krishnan, CRC Press, June 2001.

FIG. 2 illustrates a related art single switch-per-phase power converter 200 for driving a two-phase SRM. Power converter 200's circuit topology is based on splitting a dc input source voltage 201 equally to the machine side power converter. This results in a circuit requiring one controllable and one uncontrollable power device per phase winding 202, 203. Therefore, overall, power converter 200 requires two controllable power devices 204, 205 and two uncontrollable power devices 206, 207 for a two-phase SRM. The major advantage of this circuit design is that it uses a reduced number of power devices (e.g., a total of four) compared to the asymmetric converter. The disadvantage of this circuit is that it reduces the available dc source voltage by half and, therefore, doubles the current rating required for the devices and for the machine, resulting in low efficiency machine operation. A fuller description of this circuit may be found in "Switched Reluctance Motor Drives", R. Krishnan, CRC Press, June 2001.

Some variations of the single-switch-per-phase topologies are described by Harris in U.S. Pat. No. 5,075,610, by Webster in U.S. Pat. No. 5,864,477, and by Disser et al. in U.S. Pat. No. 5,900,712. Harris describes a circuit with a single-switch-per-phase topology that requires more than one diode per phase and additionally requires more than one dc link capacitor. Also, the commutating voltages to the phase windings of Harris' power converter are always less than the source dc voltage in this circuit. These are severe limitations.

Webster and Disser each describe a single-switch-per-phase topology requiring two capacitors for storing energy in the circuit. Moreover, these topologies do not provide for a common emitter connection of the switches, thereby creating an isolation requirement for the gate drive circuits and a higher cost for the additional components. As a result of the above-mention and other factors, these circuits are strongly limited to low cost variable speed applications.

FIG. 3 illustrates a related art C-Dump power converter 300 for driving a two-phase SRM. Power converter 300's circuit uses three controllable power devices 301-303 and three uncontrollable diodes 304-306, resulting in the use of six power devices. This is an intermediate circuit between those illustrated in FIGS. 1 and 2. The operating modes are somewhat restricted for this circuit, since it can apply a full dc source voltage 309 to machine windings 307, 308 only in the positive direction. Furthermore, this circuit requires an external inductor 310 or a resistor (not shown) to dissipate the energy stored in a C-dump capacitor 311. Use of external inductor 310 increases the cost, whereas the use of the power resistor (not shown) will result in a lower efficiency of the system and higher package volume, due to increased thermal considerations. Therefore, this circuit is not ideal for use with two-phase SRMs. A more detailed description of this circuit may be found in "Switched Reluctance Motor Drives", R. Krishnan, CRC Press, June 2001 and in Miller et al., U.S. Pat. No. 4,684,867, dated Aug. 4, 1987.

FIG. 4 illustrates a related art single switch-per-phase power converter 400 for driving a two-phase SRM. Power converter 400 requires one uncontrolled power device 401, 402 and one controlled power device 403, 404 per phase 405, 406, and therefore, requires four power devices to function. Furthermore, power converter 400 requires a special winding in the machine, known as a bifilar winding. This special winding increases the copper volume in the machine windings, resulting in increased cost for the machine. Additionally, power switches 403, 404 experience higher voltage stresses due to the leakage inductance between the windings of each respective phase. This leakage inductance can be minimized but cannot be eliminated in a practical machine. Therefore, this converter circuit is not widely used, despite the fact that a full dc source voltage 407 can be impressed on the machine with full controllability of the current. A more in depth description of this circuit may be found in "Switched Reluctance Motor Drives", R. Krishnan, CRC Press, June 2001 and in Miller, U.S. Pat. No. 4,500,824, dated Feb. 19, 1985.

All other heretofore known two-phase power converter circuit topologies fall into one of the above-described categories, in terms of the total number of power devices required for their operation. From the foregoing, it may be seen that a minimum of two controllable power devices are required for operating a related art two-phase SRM.

Generally speaking though, commercial power converters used to drive a two-phase SRM usually have more than two controllable switches and more than two diodes. Circuits requiring only two controllable switches and two diodes have the disadvantages of high power loss, low efficiency, and a bifilar winding in the machine, thereby reducing the power density of the machine. Therefore, existing solutions are not attractive with regard to considerations of high efficiency operation, full range of speed control, compactness in the converter's packaging and, most importantly of all, the overall cost of the system.

A fundamental challenge in power converter development has been to reduce the number of power devices, both controllable and uncontrollable, to a level corresponding to that of a single-quadrant chopper drive, such as is commonly used in a dc motor drive or in a universal motor drive. A description of these drives is provided in "Switched Reluctance Motor Drives", R. Krishnan, CRC Press, June 2001. When the number of power devices has been reduced to this level, a brushless SRM drive becomes commercially competitive for variable speed applications. Moreover, the brushless SRM has the superior advantage of high efficiency, since there are no brushes and commutators in the SRM. Also, the brushless SRM is further endowed with high-speed operability, high reliability, maintenance-free operation, greater overload capability and, most of all, a cost advantage over the dc motor drive.

All reference material cited herein is hereby incorporated into this disclosure by reference.

SUMMARY OF THE INVENTION

An object of the present invention is to overcome the above-described problems and limitations of the related art.

Another object of the invention is to provide a method and system for controlling the speed of a two-phase switched reluctance machine (TPSRM) with a power converter having only one controllable switch.

Still another object of the invention is to provide speed control for a TPSRM, controlled by a power converter having only one controllable switch, during the transition from clockwise to counter-clockwise rotation and vice versa when the TPSRM is operating as a generator.

A further object of the invention is to provide speed control for a TPSRM, controlled by a power converter having only one controllable switch, so as to recover mechanical energy from the machine's inertia and that of its load and convert this energy to electrical energy so as to achieve the effect of an electric brake.

A further object of the invention is to provide speed control for a TPSRM, controlled by a power converter having only one controllable switch, so as to operate the TPSRM in all or a subset of its four-quadrant torque-versus-speed modes of operation, which are forward motoring, forward regeneration, reverse motoring, and reverse regeneration.

These and other objects of the invention may be achieved in whole or in part by a method of regulating the speed of a two-phase switched reluctance machine (TPSRM) rotor. According to this method, a motoring mode or a braking mode of operation is selected for the TPSRM. The rotor speed is regulated, when the motoring mode is selected, using a control signal cooperatively produced by a speed control feedback loop and a current control feedback loop. When the braking mode is selected, the rotor speed is regulated using a control signal produced by the current control feedback loop without the cooperation of the speed control feedback loop. The speed control feedback loop uses an established speed control signal and a signal indicative of the rotor's speed to dynamically adjust a first parameter governing the control signal. The current control feedback loop uses an established current control signal and a signal indicative of the current flowing through a stator winding of the TPSRM to dynamically adjust a second parameter governing the control signal. The braking mode of operation converts the TPSRM's mechanical energy into electrical energy to produce a braking effect on the rotation of the rotor.

The objects of the invention may also be achieved in whole or in part by a drive system for regulating the speed of a two-phase switched reluctance machine (TPSRM) rotor. The system includes a speed control feedback loop component that uses an established speed control signal and a signal indicative of the rotor's speed to dynamically adjust a first parameter, and a current control feedback loop component that uses an established current control signal and a signal indicative of the current flowing through a stator winding of the TPSRM to dynamically adjust a second parameter. A control signal for regulating the speed of the TPSRM rotor is produced in accordance with the first and second parameters when the TPSRM is operated in a motoring mode, and the control signal for regulating the speed of the TPSRM rotor is produced in accordance with the second parameter but not the first parameter when the TPSRM's braking mode is selected. The braking mode of operation converts the TPSRM's mechanical energy into electrical energy to produce a braking effect on the rotation of the rotor.

The objects of the invention may be further achieved in whole or in part by a method of reversing the rotational direction of a two-phase switched reluctance machine (TPSRM) rotor. According to this method, the flow of current through a single controllable current valve is regulated to maintain a forward motoring mode of operation for the TPSRM. Then, the flow of current through the single controllable current valve is regulated to cause the TPSRM's mechanical energy to be converted into electrical energy so as to produce a braking effect on the rotation of the rotor. Thereafter, the flow of current through the single controllable current valve is interrupted for a period of time. After the period of time has expired, the flow of current through the single controllable current valve is regulated to induce the TPSRM's rotor to reverse its direction of rotation.

The objects of the invention may be further achieved in whole or in part by a system for reversing the rotational direction of a two-phase switched reluctance machine (TPSRM) rotor. The system includes a controller and a single controllable current valve that regulates, under the control of the controller, the current flowing through the current valve so as to establish the rotational direction and speed of the rotor. Together, the controller and the current valve cooperate to maintain a forward motoring mode of operation for the TPSRM, when the TPSRM's rotor is to continue rotating in its current direction. Also, the controller and the current valve cooperate to cause the TPSRM's mechanical energy to be converted into electrical energy so as to produce a braking effect on the rotation of the rotor, when a reversal in the rotor's direction of rotation is to be achieved. After the rotor has been braked, the controller and the current valve cooperate to interrupt the flow of current through the single controllable current valve for a period of time. Then the controller and the current valve cooperate to regulate the flow of current through the single controllable current valve to induce the TPSRM's rotor to reverse its direction of rotation.

The objects of the invention may be further achieved in whole or in part by a method of starting the rotation of a rotor of a two-phase switched reluctance machine (TPSRM) whose main and auxiliary phase windings are energized under the control of a single controllable current valve. According to this method, current is conducted through the current valve in a single conduction pulse. Then, a determination is made as to whether the TPSRM's rotor is rotating. If not, current is again conducted through the current valve in a single conduction pulse.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

Figure 1:
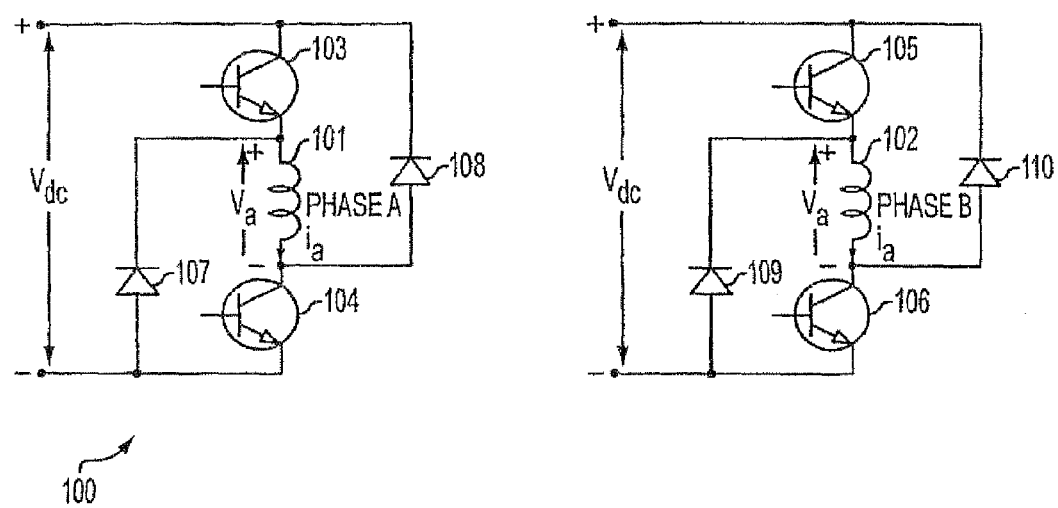
FIG. 1 illustrates a related art asymmetric power converter for driving a two-phase SRM.
Figure 2:
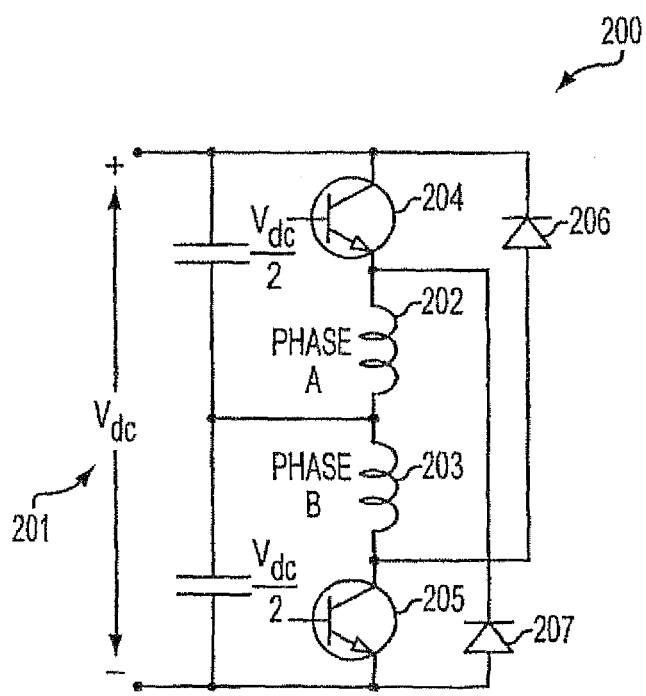
FIG. 2 illustrates another related art single switch-per-phase power converter for driving a two-phase SRM.
Figure 3:
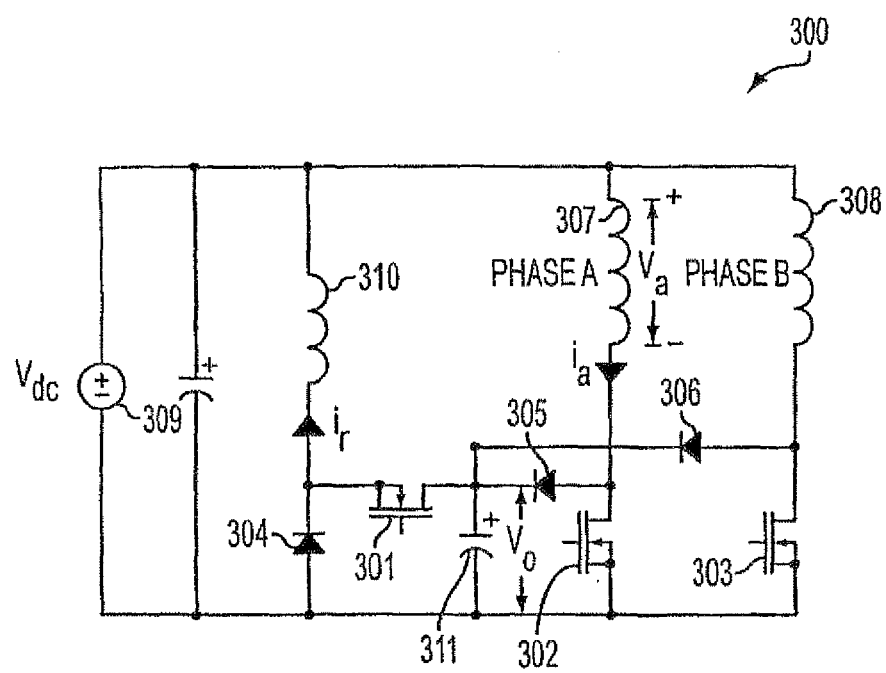
FIG. 3 illustrates still another related art C-Dump power converter for driving a two-phase SRM.
Figure 4:
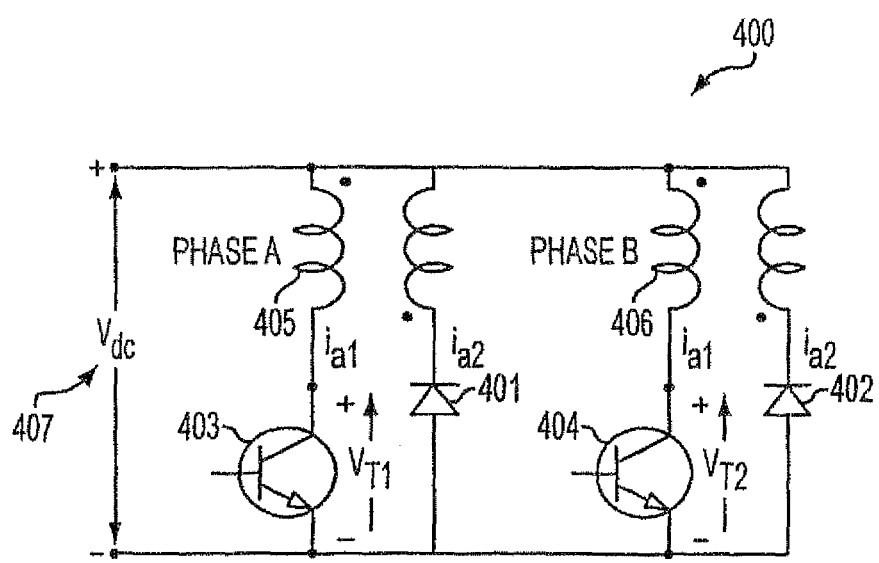
FIG. 4 illustrates still another related art single switch-per-phase power converter for driving a two-phase SRM.
Figure 5:
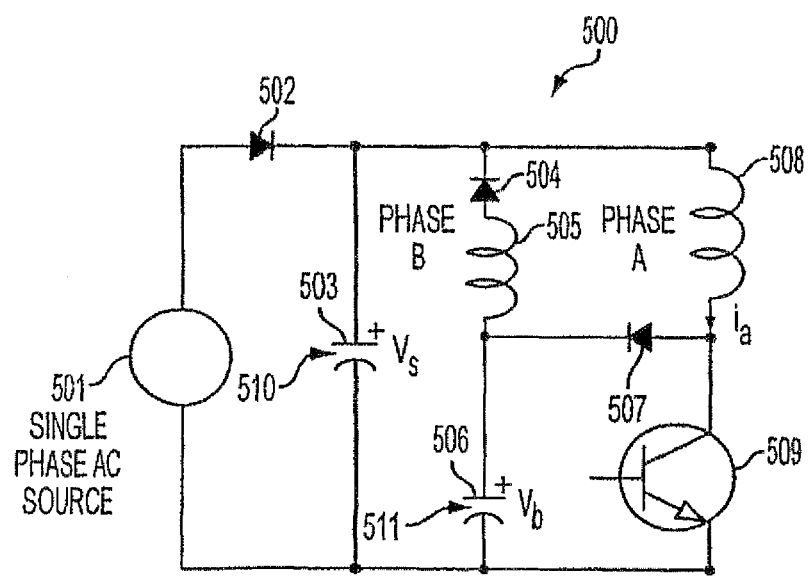
FIG. 5 illustrates a single-switch power controller in the form of a converter for driving a two-phase switched reluctance machine (SRM)

FIG. 5 illustrates a single-switch power controller in the form of a power converter 500 for driving a two-phase switched reluctance machine (SRM). One winding of the SRM is alternatively referred to as a main or phase A winding 508, while the other winding is referred to as an auxiliary or phase B winding 505. Although phase windings 505, 508 of the SRM may be spatially separated from power converter 500 and may also be considered to form a part of the machine (also referred to herein as a motor) rather than part of the power converter, these windings 505, 508 are illustrated in the power converter circuit for the purpose of simplifying the description of their cooperative functionality with power converter 500.

When power converter 500 is activated by the application of an alternating current (ac) source voltage 501, a dc source 510 comes into effect through the rectification and filtering provided by a diode 502 and a dc source capacitor 503, respectively. As dc source 510 comes into effect, current begins flowing through electrical paths that are parallel to capacitor 503. These parallel paths are provided by: (1) auxiliary phase B winding 505 and an auxiliary capacitor 506, provided that an optional diode 504 is not included in the circuit, and (2) main phase A winding 508, a diode 507, and auxiliary capacitor 506. The flow of current through these parallel paths charges auxiliary capacitor 506, and the energy stored in auxiliary capacitor 506 generates a current in auxiliary phase B winding 505 and dc source capacitor 503.

Because of the current flow in auxiliary winding 505, there will be a positive or negative torque produced in the SRM, depending on the SRM's rotor position with respect to auxiliary phase B winding 505's stator poles. If the rotor poles are coming toward the stator poles, the inductance slope is positive, and if the rotor poles are moving away from the stator poles, the inductance slope is negative. If there is a negative inductance slope, the torque produced will be negative and the machine will be generating and sending energy to source capacitor 503. If the inductance slope is positive, auxiliary phase B winding 505 will produce positive or motoring torque, which is torque output by the SEW.

When the current in auxiliary phase B winding 505 is constant and flows continuously, the average torque produced by auxiliary winding 505 is zero. However, current flow through auxiliary winding 505 will not remain constant. After a period of conduction, the current in auxiliary winding 505 discontinues, and this occurs when the voltages across auxiliary capacitor 506 and dc source capacitor 503 equalize. Thereafter, another way must be provided to charge auxiliary capacitor 506. A transistor switch 509 provides this other way.

Transistor switch 509 is turned on to provide power to main winding 508. In response to turning on transistor switch 509, a current path is established through dc source 510, main winding 508, and transistor switch 509. During the period transistor switch 509 is turned on, main winding 508 is operating in its energization mode. Transistor switch 509 is turned off either to regulate the current through main winding 508 or to stop its flow completely.

Due to the inductive nature of main winding 508, it is important to provide a path for the current to flow away from main winding 508 when transistor switch 509 is turned off. This path is provided by diode 507, auxiliary capacitor 506, do source capacitor 503, and main winding 508 itself. The current flowing out of main winding 508 charges auxiliary capacitor 506, and this flow of current is the predominant way in which auxiliary capacitor 506 receives a charge, when operating the SRM.

The energy flow in auxiliary capacitor 506 and, hence, in auxiliary winding 505 is dependent on main winding 508's energy flow and, therefore, its duty cycle. As the speed of the SRM increases, the controllable duty cycle of transistor switch 509 increases, thereby increasing the duration of the voltage applied to main winding 508. Therefore, less charging of auxiliary capacitor 506 occurs, and, hence, less power is provided to auxiliary winding 505. During times of operating transistor switch 509 with a high duty cycle, the SRM behaves as though it is a single-phase SRM, with auxiliary winding 505 serving as a window to find the rotor position of the machine through its inductance. Auxiliary winding 505's inductance can be obtained from its current and voltage waveform or by some other technique known to those skilled in the art.

Auxiliary winding 505 returns to dc source capacitor 503 the energy it receives from main winding 508, when transistor switch 509 is turned off. During low speed operation, transistor 509's duty cycle is low and both auxiliary winding 505 and main winding 508 are active and produce motive power. Therefore, the SRM serves as a two-phase SRM. This resembles a capacitor-start and capacitor-run single-phase induction motor. It should be noted that such a single-phase induction motor has two phase windings.

Figure 6:
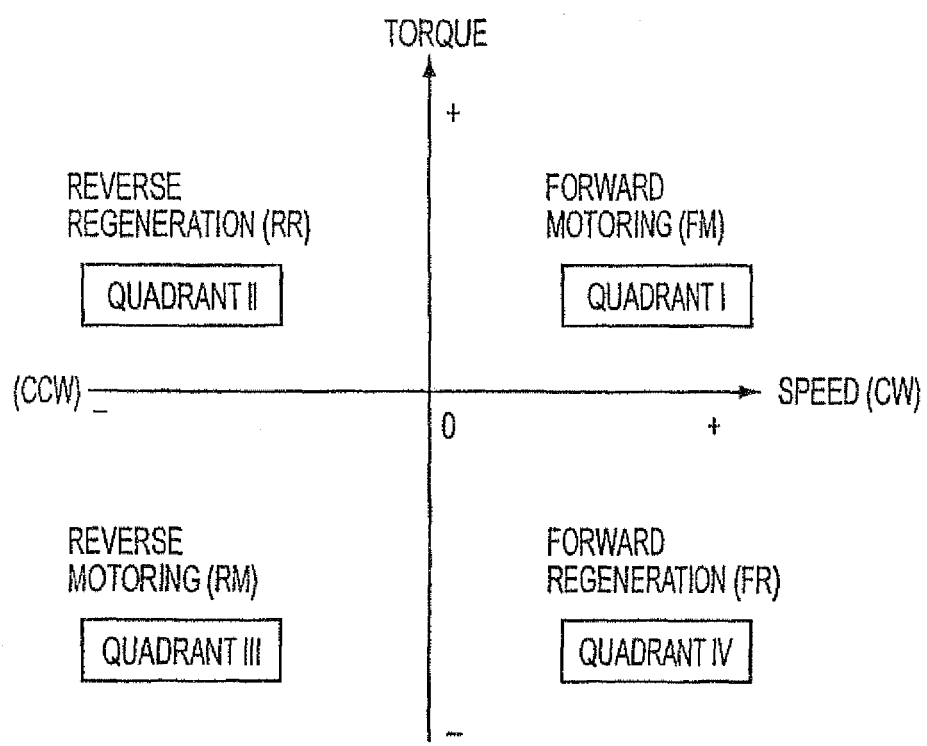
FIG. 6 illustrates the four quadrants of torque versus speed operation for a TPSRM.
Figure 7A:
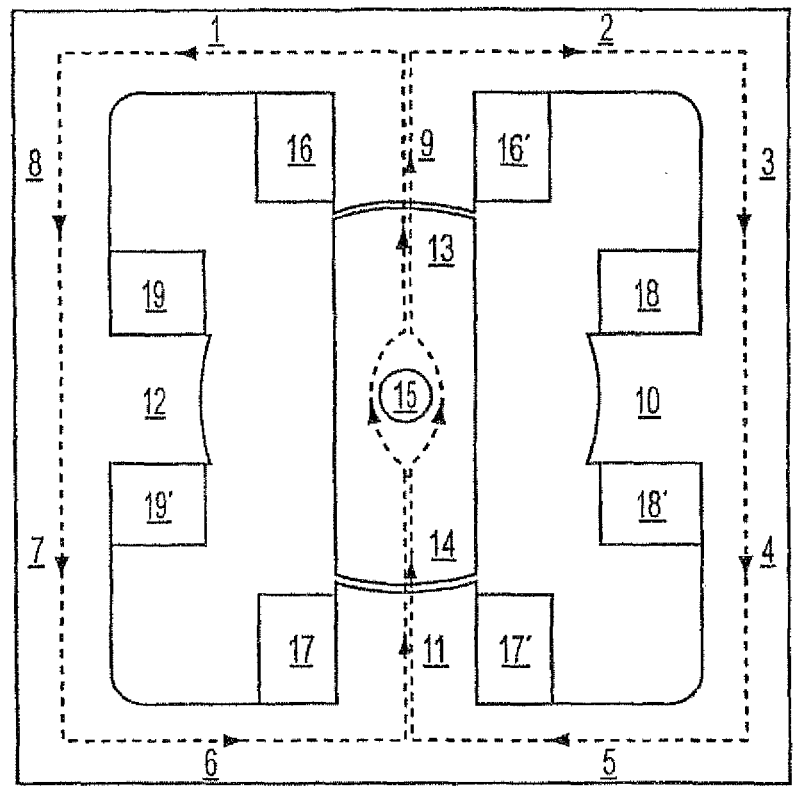
FIG. 7(a) illustrates a TPSRM and its flux paths during the excitation of its phase A windings.
Figure 7B:
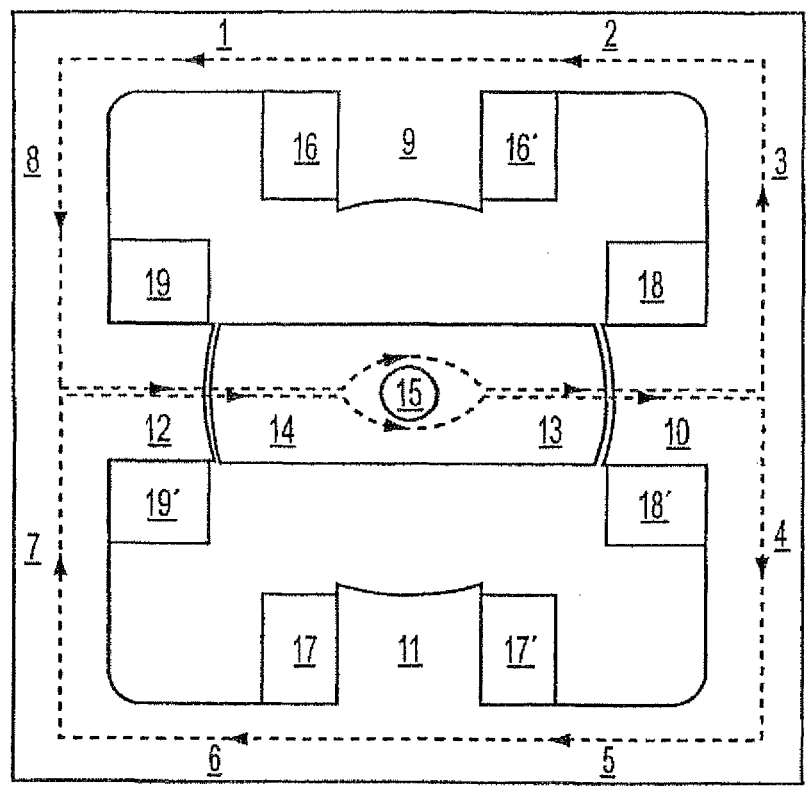
FIG. 7(b) illustrates the TPSRM of FIG. 7(a) and its flux paths during the excitation of its phase B windings.

FIG. 6 illustrates the four quadrants of torque versus speed operation for a TPSRM. Quadrants I, II, III, and IV correspond respectively to the operational modes of forward motoring (FM), reverse regeneration (RR), reverse motoring (RM), and forward regeneration (FR).

Speed control is achieved in the clockwise (CW) direction of rotation by forward motoring and in the counter-clockwise (CCW) direction of rotation by reverse motoring. During forward and reverse motoring operation, the TPSRM produces mechanical power from the input of electrical power.

Also, speed control may be achieved when operating the TPSRM as a generator, during the transition from CW rotation to CCW rotation direction or vice versa. This operational mode provides the effect of an electric brake in that mechanical energy is recovered from the stored energy in the machine's inertia and its load inertia for conversion to electrical energy. By recovering the mechanical energy, the machine may be quickly slowed down without the use of a mechanical brake (use of a mechanical brake dissipates the energy resulting in low efficiency). When the mechanical energy is not recovered for conversion to electrical energy, the machine rotation will slow down by its inertia alone, but this may take longer since the mechanical energy is not harvested.

The transition from forward to reverse motoring is known as forward regeneration, and the reverse transition is known as reverse regeneration. A more complete description of an SRM's operational modes may be found in each of "Switched Reluctance Motor Drives", R. Krishnan, CRC Press, June 2001, and "A Sensorless Switched Reluctance Drive," Electric Machines and Drives, C E B Green and J M Stephenson, 1997, pp. 64-68.

Figure 8:
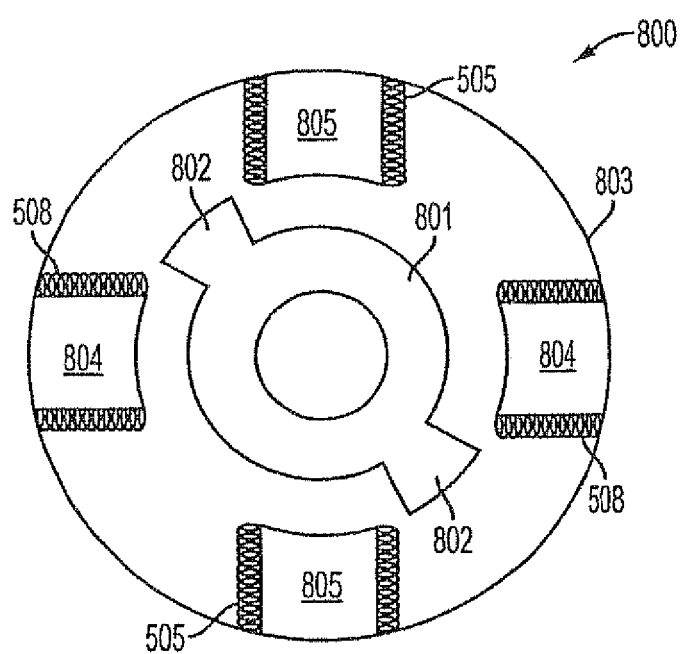
FIG. 8 illustrates a rotor and stator of a two-phase SRM motor with main and auxiliary windings wound on respective stator poles.

FIG. 8 illustrates a rotor and stator of a two-phase SRM motor with main and auxiliary windings wound on respective stator poles. Referring to FIG. 8, a two-phase SRM motor 800 is shown having a rotor 801 and a stator 803. Rotor 801 has two salient poles 802, and stator 803 has four salient poles 804, 805. Stator poles 805 have auxiliary winding 505 wound around them, and stator poles 804 have main winding 508 wound around them.

Power converter 500 provides a single-controllable-switch converter to control the speed of TPSRM 800 in all four quadrants of torque versus speed operation. Two issues related to controlling the four-quadrant operation of TPSRM 800 with power converter 500 are discussed below.

A first issue concerns starting the rotation of the TPSRM's rotor both for instances where the main stator poles are in alignment with the rotor poles and not. Though the invention is not limited to an embodiment in which the main and auxiliary windings are equal in number or size, assume for the purpose of explaining this operational issue that TPSRM 800 is used. Main winding 508 primarily produces the motive power and auxiliary winding 505 is used for start-up and for reversing the rotational direction of the motor.

When rotor poles 802 are aligned with stator poles 804 and main phase winding 508 is excited, the machine will not produce any torque since the rate of change of inductance is zero in this position. An SRM produces torque only when there is a change of inductance with respect to rotor position. But it is not possible to excite auxiliary phase winding 505 independently when TPSRM 800 is operated with a single-controllable-switch converter. Therefore, the rotor and stator poles must be moved away from an aligned position at the time of starting.

Power converter 500 may be used to move the rotor and stator poles away from an aligned position in the following way. Transistor switch 509 is pulsed on for a considerable period of time, and if the machine does not start, then a second pulse is applied after about one second to make the rotor move. No further pulses are needed to start the movement of TPSRM 800's rotor.

The second issue concerns, assuming that the machine is reliably started, keeping the machine running in quadrants I, II, III and IV in light of the fact that there is no independent way to energize the main 508 and auxiliary 505 phases of TPSRM 800 with power converter 500, since it has only one controllable switch 509. This issue is discussed more fully below.

A large amount of literature exists concerning the four-quadrant control of SRM drives, such as described by R. Krishnan, "Switched reluctance motor drives", CRC Press, June 2001; Syed Hossain, Iqbal Husain, Harald Klode, Bruno Lequesne, and Avoki Omekanda, "Four-Quadrant Control of a Switched Reluctance Motor for a Highly Dynamic Actuator Load", APEC, 2002, pp. 41-47, C E B Green and J M Stephenson, "A Sensorless Switched Reluctance Drive", Electric Machines and Drives, 1997, pp. 64-68; B. Fahimi and Raymond. B Sepe Jr., "Development of 4-Quadrant Sensorless Control of SRM Drives Over the Entire Speed Range", IEEE-IAS, 2002, pp. 1625-1632; and G. Suresh, B. Fahimi, K. M. Rahman, M. Ehsani, and I. Panahi, "Four-quadrant Sensorless SRM Drive with High Accuracy at All Speeds", APEC, 1999, pp. 1226-1231. However, no literature is known to exist for SRM drives having a single-controllable-switch power converter, excluding applicant's patent applications. This is due to the absence of such a power converter in the related art. Significant features peculiar to this converter are its limited degree of direct-current control of a TPSRM's main phase and its heavy dependence on the auxiliary phase winding and auxiliary capacitor state. Additionally, the degree of control that may be exerted over the current flowing through the auxiliary winding is dependent on the duty cycle of the controllable switch, motor speed and load, and state of the auxiliary capacitor. These constraints on the current control through the auxiliary winding have to be managed very tightly to implement four-quadrant variable-speed operation of a TPSRM, as described below.

Once TPSRM 800 is started up, the normal running control involves turning on transistor switch 509 when rotor poles 802 are unaligned with respect to the main stator poles 804 (i.e., the rotor poles are more nearly aligned with the auxiliary stator poles) and turning off transistor switch 509 just before or at the complete alignment of the main stator and rotor poles 804 and 802, respectively. The running control is described more fully below with respect to the four speed-versus-torque operational modes.

Assume the intended direction of rotation for rotor 801 is clockwise (CW). Main winding 508 on main stator poles 804 is energized with a current, and this current is commutated when the rotor and main stator poles 802, 804 align or are close to alignment. During this energization period, the inductance slope of main winding 508 is positive. Hence, the torque produced is positive and in the direction of rotor 801's movement. Assuming that a CW rotation is positive, motor 800 is delivering positive output power (i.e., motoring torque). In other words, when the torque and speed are positive, so too is the power output of motor 800. This condition indicates quadrant one operation.

For quadrant four operation, the torque has to be negative when the speed is positive. As a result, motor 800 delivers negative power in quadrant four operation. That is, the power is taken from SRM 800 and fed to dc source capacitor 503. This is called regeneration in the CW direction of rotation. In order to produce negative torque, the current in main winding 508 is injected when rotor poles 802 move away from alignment with respect to main stator poles 804.

For quadrant three operation, rotor 801 rotates in the counter-clockwise (CCW) direction and torque is applied in this direction, resulting in negative speed and negative torque and contributing to positive power. Therefore, this is motoring in the reverse direction. Reverse direction motoring is achieved by energizing main winding 508 when rotor poles 802 start to move CCW front a completely unaligned position with respect to main stator poles 804. The current is commutated in main winding 508 when the rotor and main stator poles 802, 804 align or are near alignment.

Quadrant two operation is very similar to that of quadrant four, but the torque is positive (CW) and the speed is negative (CCW). Quadrant two operation, therefore, provides negative output power. This is regeneration in the CCW direction of rotation and is realized by energizing main winding 508 with a current when rotor poles 802 start moving CCW away from alignment with main stator poles 804.

Figure 9:
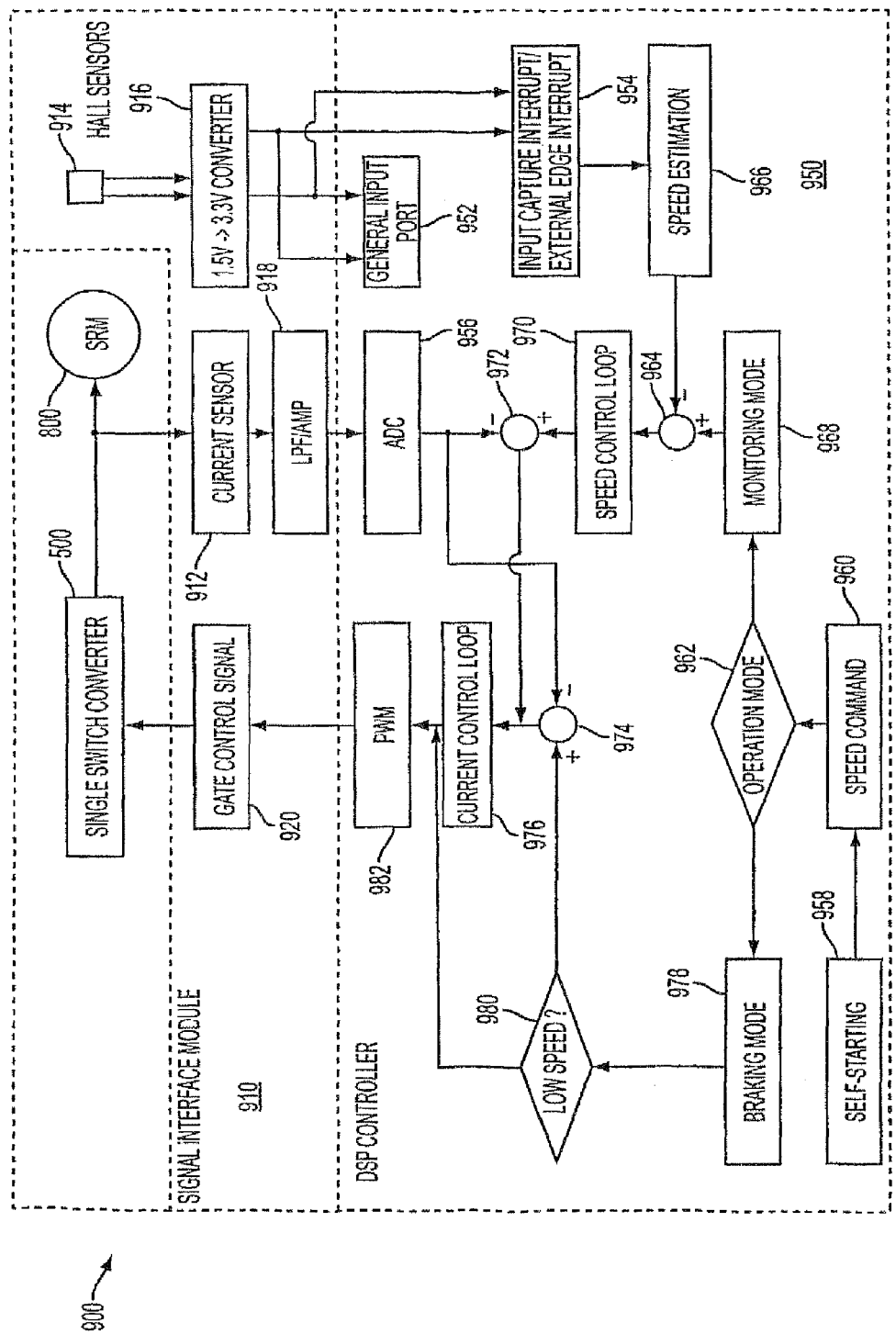
FIG. 9 illustrates a drive system for a TPSRM.

FIG. 9 illustrates a drive system 900 for a TPSRM. Drive system 900 includes power converter 500, SRM 800, a signal interface module 910, and a digital signal processor (DSP) controller 950. Signal interface module 910 has a current sensor 912 for sensing the current flowing through main phase winding 508 (or some signal indicative of this current) and Hall-effect sensors 914 for detecting two discrete positions, spaced 90° apart, of SRM 800's rotor. A voltage converter 916 of signal interface module 910 converts the output signals of Hall-effect sensors 914 before providing the converted signals to a general and an interrupt component 954 of DSP controller 950. A signal indicative of the current sensed by current sensor 912 is filtered and amplified by a low-pass filter/amplifier 918 and provided to DSP controller 950 through its analog-to-digital converter (ADC) 956. DSP controller 950 estimates the rotational speed of SRM 800's rotor from successively sensed rotor position signals provided by interrupt component 954.

A self-starting component 958 outputs a start-up signal to a speed command component 960 so as to activate a speed command, which consists of the intended magnitude and direction for SRM 800's rotor. The operational mode, corresponding to motoring or braking, of SRM 800 is determined by an operational mode component 962 based on the speed command. If the mode is determined to be the motoring mode, a summer 964 calculates a speed error from the difference between the speed estimated by DSP controller 950, in speed estimator component 966, and the speed command provided by operational mode component 962 via a motoring mode component 968. The speed error is provided to a speed control loop component 970, which may be a proportional plus integral (PI) controller. Speed control loop component 970 produces a current command that is regulated by a current feedback control component, which may also be a proportional plus integral type controller.

The current feedback control component comprises a summer 972, a summer 974, and a current control loop component 976. Summer 972 determines the difference between the current command and a digital representation of the current signal provided to ADC 956. The difference value output by summer 972 is provided to current control loop component 976 to produce a control signal that is proportional to the duty cycle of transistor switch 509 in power converter 500. This control signal is provided to a pulse width modulator (PWM) 982 and updated for every carrier period of pulse width modulation control exerted on SRM 800. PWM 982 generates a pulse width modulation signal, from the control signal, that is provided to a gate control signal component 920 of signal interface module 910. Gate control signal component 920 produces a gate control signal that turns transistor switch 509 of power converter 500 on and off.

If the speed command produced by speed command component 960 indicates that regenerative braking is to be performed, then DSP controller 950 produces the control signal in a different way. Operation mode component 962 indicates to a braking mode component 978 that the regenerative braking mode is in effect. Braking mode component 978 provides an indication of SRM 800's rotor speed to a low speed component 980. If SRM 800's rotor speed is above a threshold low speed, summer 974 determines a difference between a current command that is output by low speed component 980 and the digital representation of the sensed current signal output by ADC 956. The difference signal determined by summer 974 is provided to current control loop 976 to generate the control signal for the braking mode of operation, which controls pulse width modulator 982 so as to regulate transistor switch 509. If SRM 800's rotor speed is lover than the threshold low speed, then low speed component 980 provides a reversal pulse to PWM 982 that overrides the control signal output by current control loop 976 so that this reversal pulse regulates the pulse width modulated signal produced by PWM 982.

Once SRM 800's rotor speed is reversed, the controller automatically goes into motoring mode in the opposite direction and current control loop 976, again, dynamically determines and controls the pulse width modulation signal that serves as the gate control signal for transistor switch 509.

Figure 10:
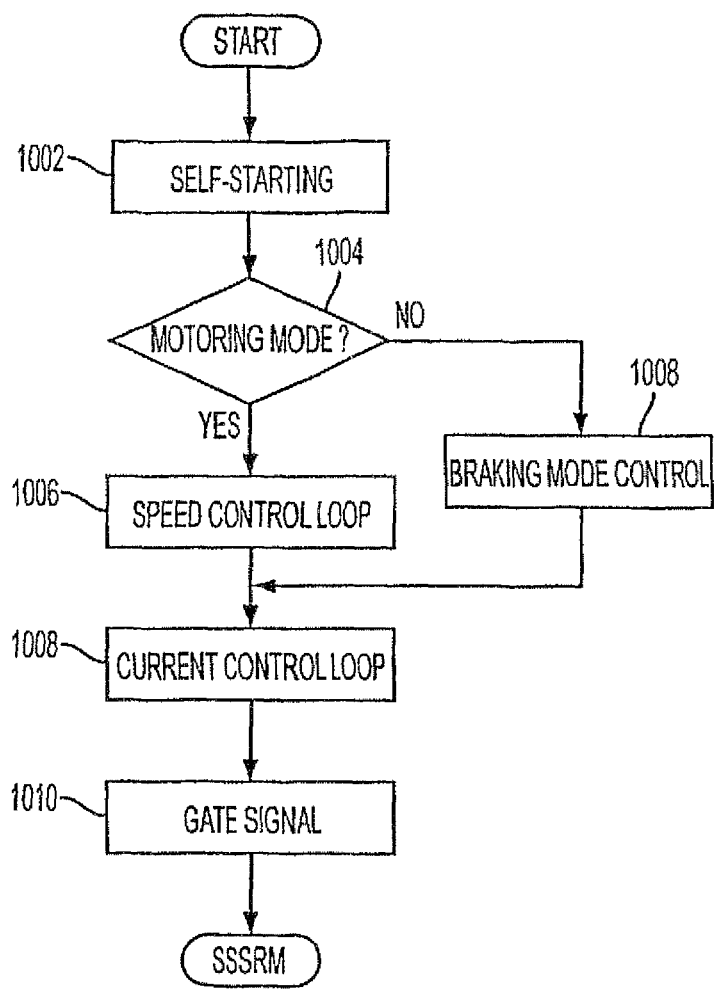
FIG. 10 illustrates an algorithm for controlling the drive system, illustrated in FIGS. 9 and 13, while motoring or braking the TPSRM illustrated in FIG. 8.
Figure 13:
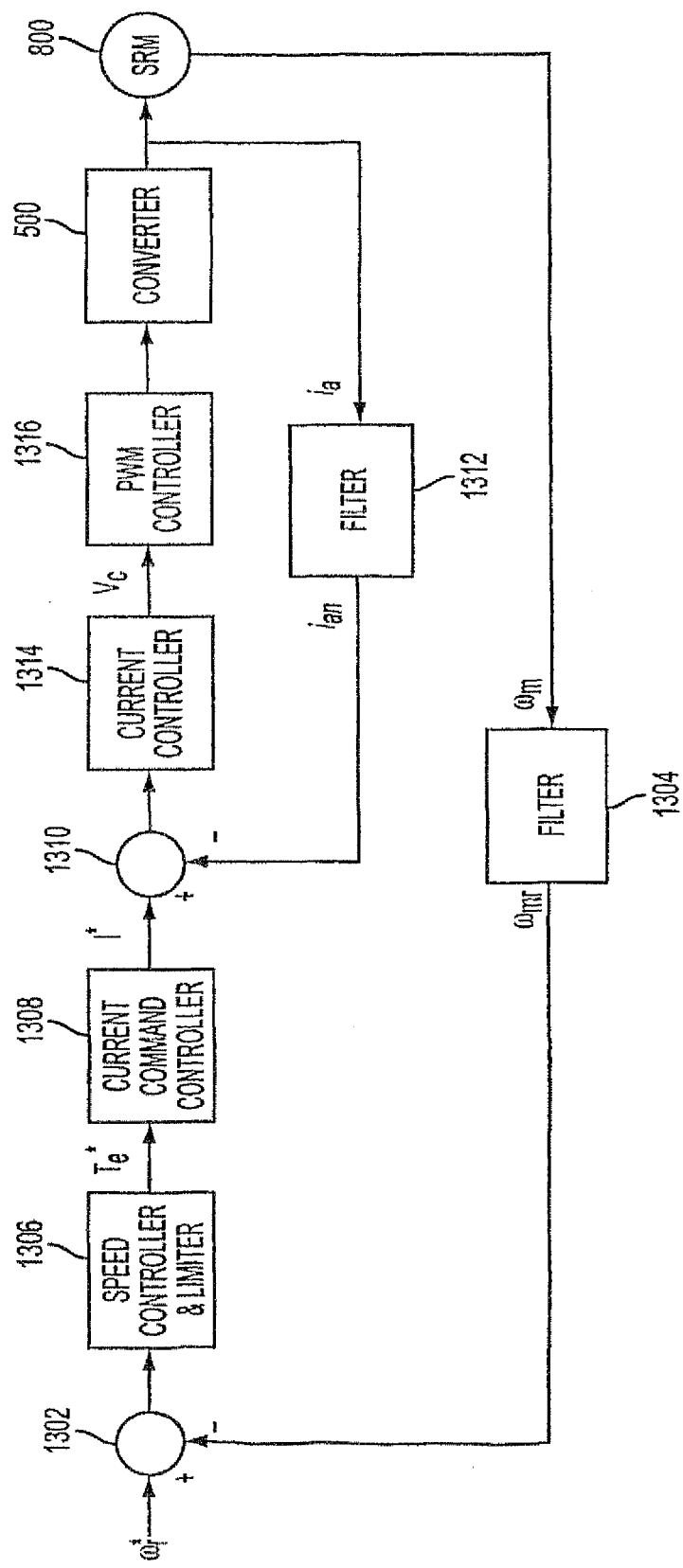
FIG. 13 illustrates a block diagram of a system for implementing the speed control loop and current control loop within the drive system illustrated in FIG. 9.
Figure 14A:
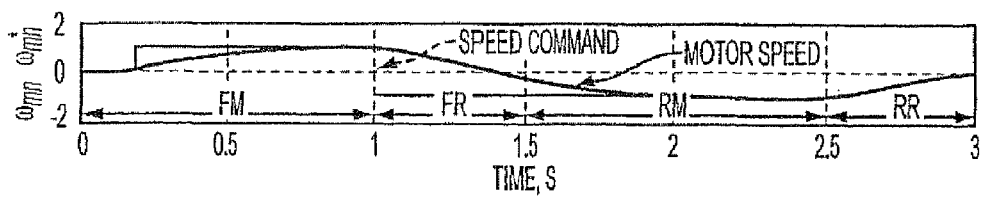
FIG. 14 illustrates simulated operational parameters of the drive system illustrated by FIG. 13.
Figure 14B:
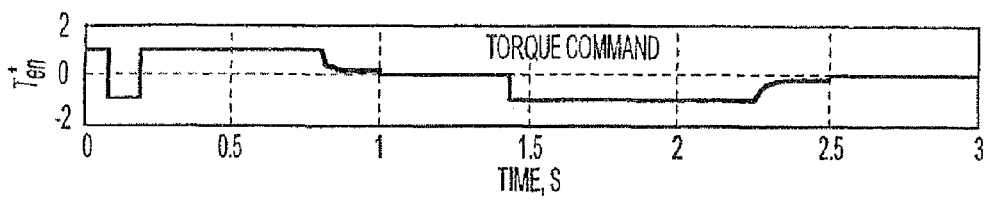
Figure 14C:
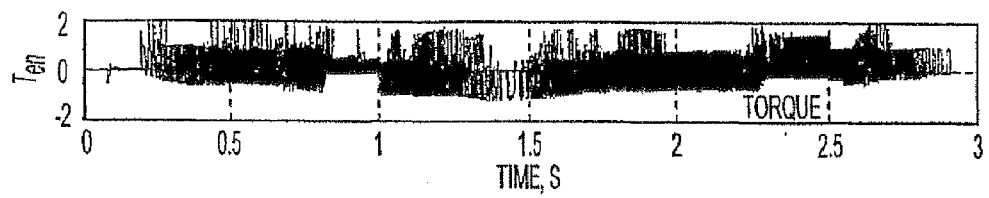
Figure 14D:
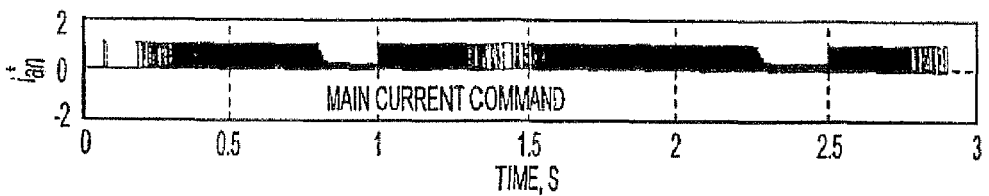
Figure 14E:
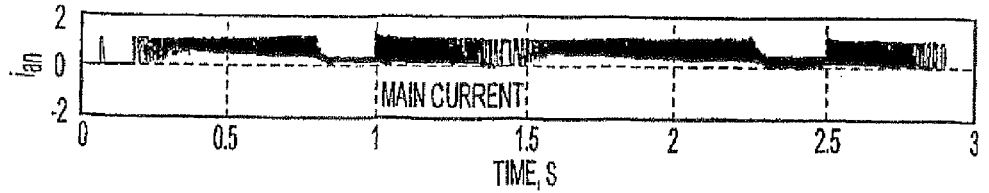

FIG. 10 illustrates an algorithm for controlling the drive system, illustrated in FIGS. 9 and 13, while motoring or braking the TPSRM illustrated in FIG. 8. Operational control of SRM 800 begins with the execution by self-starting component 958 of a self-starting operation 1002 that sets SRM 800's rotor in rotational motion. After self-starting operation 1002 is complete, operation mode component 962 determines 1004 whether the motoring mode is in effect. If so, then monitoring mode component 968 regulates 1006 the generation of the current command by speed control loop component 970. Otherwise, braking mode component 978 regulates 1008 the generation of the current command. In either case, current control loop component 976 regulates 1010 the pulse width modulation signal generated by PWM 982 based on the current command and the control signal generated therefrom.

Figure 11:
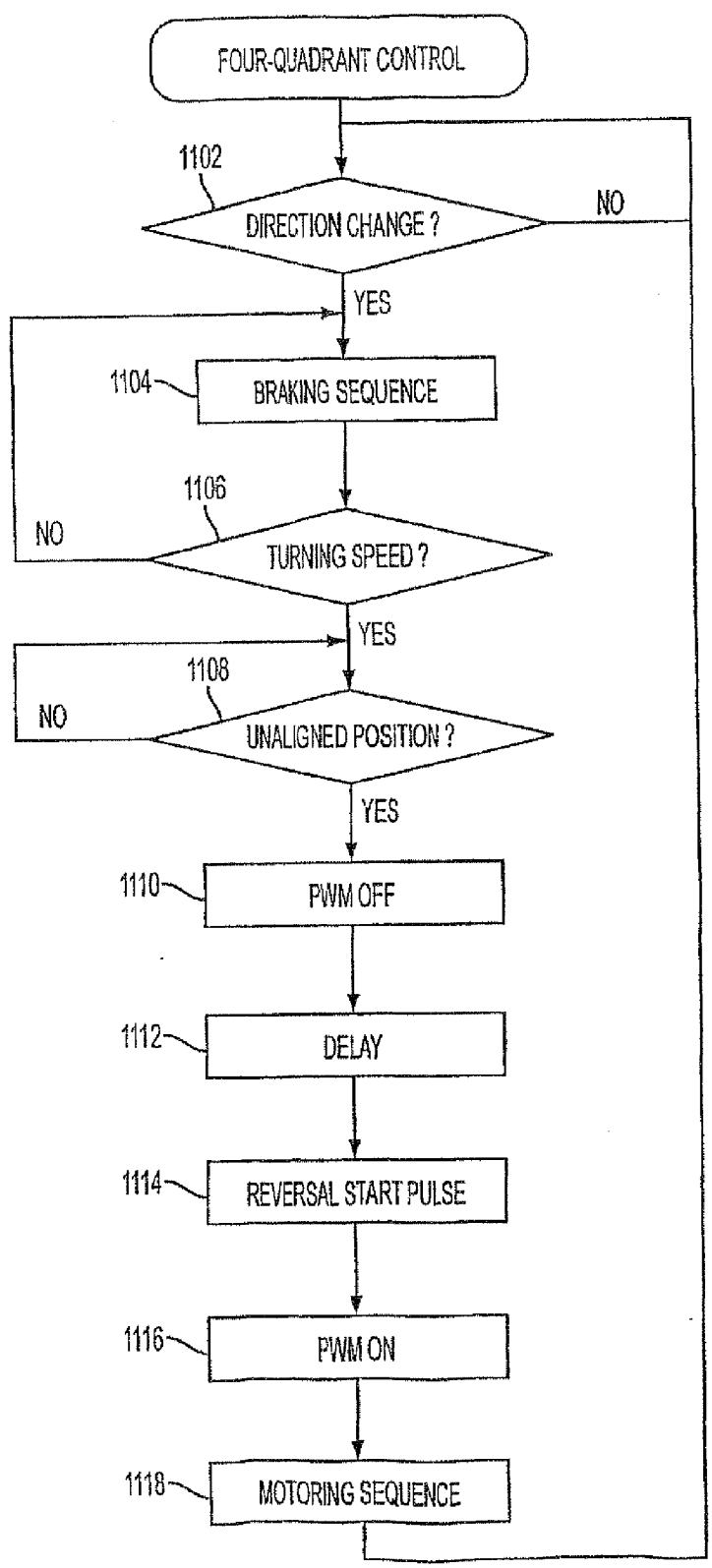
FIG. 11 illustrates a four-quadrant control algorithm for the drive system illustrated by FIG. 9.

FIG. 11 illustrates a four-quadrant control algorithm for the drive system illustrated by FIG. 9. According to this control implementation, drive system 900 continuously monitors the operation of SRM 800 to determine 1102 whether SRM 800's rotor should change its direction of rotation. When a change of direction is indicated, a braking sequence is executed 1104 to slow the rotational speed of SRM 800's rotor. If the turning speed of SRM 800's rotor is below a threshold speed 1106, then a determination 1108 of the alignment between SRM 800's rotor and stator poles is made. Otherwise, the braking sequence 1104 is continued. If SRM 800's rotor and stator poles are unaligned, then the pulse width modulation signal applied to transistor switch 509 is discontinued 1110. Otherwise, drive system 900 waits until SRM 800's rotor and stator poles have rotated to an unaligned position. After the pulse width modulation signal is discontinued 1110, drive system 900 executes a delay operation 1112, for a particular period of time, before generating a reversal start pulse 1114. Thereafter, the pulse width modulation signal is reactivated 1116 so that a motoring sequence 1118 may be executed for controlling SRM 800's rotor.

Accordingly, a purpose of the four-quadrant control algorithm is to set up a PWM sequence with respect to a quadrant command and to generate a start pulse for reversal. After the rotor speed reaches the desired speed, the starting signal for reversal will be applied to the power converter.

DSP controller 950 checks 1108 for an unaligned position of SRM 800's rotor and stator poles, in the four-quadrant control algorithm illustrated in FIG. 11, so as to obtain a huge negative torque with short delay. The maximum negative torque can be produced after the rotor passes the unaligned position (90°) (i.e., preferably more than half way between adjacent stator poles in its rotation). PWM off 1110 indicates the deactivation of the PWM function, so as to slow and decrease the current flow in main winding 508. Delay 1112 is the time duration needed to move rotor 801 to the maximum negative torque position.

Figure 12:
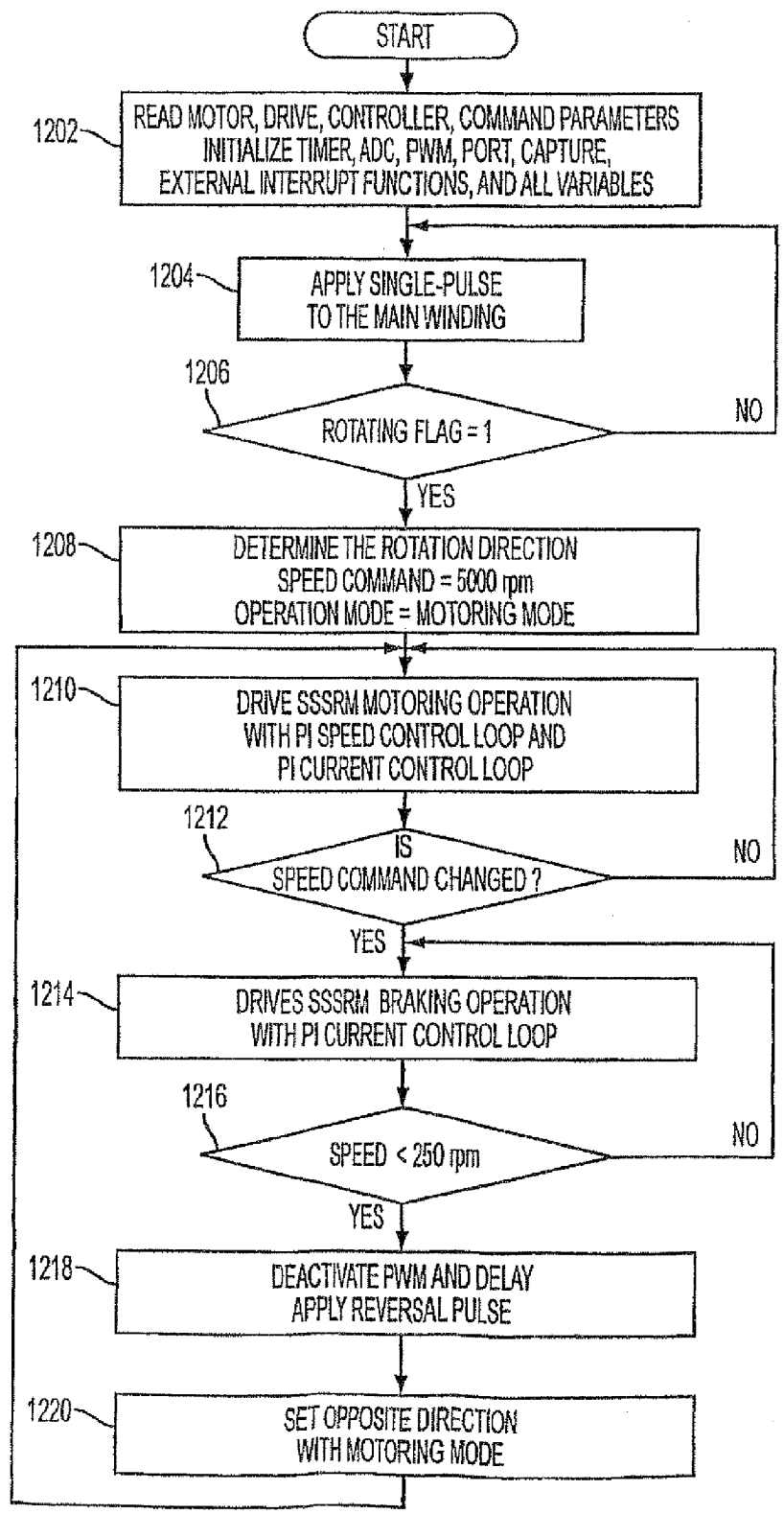
FIG. 12 illustrates an algorithm for the operation of the drive system illustrated in FIG. 9.

FIG. 12 illustrates an algorithm for the operation of drive system 900. According to this algorithm, DSP controller 950 initializes 1202 its mode of operation by examining SRM 700's rotor position and the sensed current provided by Hall-effect sensors 914. Additionally, DSP controller 950 determines its operational command parameters and initializes a timer, ADC 956, general input port 952, interrupt component 954, its external interrupt functions, and its operating variables. After initialization, DSP controller 950 applies 1204 a single pulse to transistor switch 509 via signal interface module 910. If this pulse does not cause SRM 800's rotor to begin turning, as determined in step 1206, another pulse is applied 1204. If rotor 901 is determined 1206 to be turning, DSP controller 950 determines 1208 the rotor's direction of rotation, sets 1208 a speed command, such as 5000 revolutions per minute (rpm), and sets 1208 SRM 800's operational mode to the motoring mode. Thereafter, DSP controller 950 drives 1210 the single switch SRM (SSSRM) 800's motoring operation in accordance with a proportional integrator (PI) speed control loop and a PI current control loop, until the speed command is determined 1212 to have changed. When the speed command is changed to indicate a reversal of rotational direction for SSSRM 800's rotor, DSP controller 950 drives 1214 a braking operation for SSSRM 800 using a PI current control loop, until the rotational speed of SSSRM 800's rotor is determined 1216 to be rotating at less than a threshold speed, such as 250 rpm. When the rotor's speed falls below this threshold, DSP controller 950 deactivates 1218 the PWM control of transistor switch 509 and waits 1218 an established delay time before applying 1218 a reversal pulse to SSSRM 800's rotor. Then, DSP controller 950 establishes 1220 this reverse direction of rotation as the desired direction and re-establishes the motoring operation drive 1210 for the new direction of the rotor's rotation.

FIG. 13 illustrates a block diagram of a system for implementing the speed control loop and current control loop within the drive system illustrated in FIG. 9. A summer 1302 determines a speed error signal by subtracting a filtered speed indication signal from a speed command. This speed error signal is provided to a speed controller and limiter 1306, which generally is a proportional plus integral type controller. Speed controller and limiter 1306 performs a predetermined operation on the speed error signal and outputs the result to a current command controller 1308. Current command controller 1308 performs a predetermined operation on the signal provided by speed controller and limiter 1306 to generate a current command.

The current command can be determined in many ways. The standard method is to set the current command proportional to the square root of a torque command, which is the output of the speed controller and limiter 1306. The present invention is not restricted by the algorithm that may be used in the current command generator.

A summer 1310 determines a current error signal by subtracting a filtered indicator of the current flowing through transistor switch 509 from the current command. Current controller 1314 performs a predetermined operation on the current error signal and outputs the result to a PWM controller 1316. PWM controller 1316 generates a pulse width modulation signal from the signal received from current controller 1316. The pulse width modulation signal is provided to power converter 500 for turning on and off transistor switch 509 and thereby controlling the energization of SRM 800's phase windings. A current filter 1312 filters, using a low pass filter, the sensed indicator of the current flowing between power convertor 500 and SRM 800, and a filter 1304 filters the rotor speed obtained from processing the rotor position signals, sensed from SRM 800, in a DSP or from a hardware circuit.

FIG. 14 illustrates simulated operational parameters of the drive system illustrated by FIG. 13. Torque and current parameters are graphed as a function of an applied speed command for the four-quadrant operational modes of forward motoring, forward regeneration, reverse motoring, and reverse regeneration. The units of measure for the parameters illustrated in FIG. 14 are presented in normalized units (e.g., 1 p.u. means 100% times the base value of the variable).

As may be seen in FIG. 14, when the rotor speed and its command are positive, then SRM 800 is in its quadrant I mode of operation of forward motoring. Note that during this time, the power is positive as the machine is being powered by the positive torque to keep it running in the CW direction (by the convention used herein, CW speed is positive speed).

When the command speed is made negative so as to make SRM 800 run in the negative direction (CCW), the torque of the machine is made negative. Hence, the power output is negative, indicating that the machine is operating as a generator by transferring mechanical energy from the machine to the power supply as electrical energy. This brakes the machine rotor resulting in a faster decrease in speed. The speed is positive (CW) but torque is negative. Therefore, SRM 800 is in its quadrant IV mode of operation of forward regeneration.

When the machine rotor reaches zero speed, the machine continues to produce negative torque, thus causing the motor rotor to rotate in the CCW direction (because positive torque runs the rotor in the CW direction), which is negative speed (as CW speed is positive). This corresponds to the quadrant III mode of operation, as the speed and torque are both negative and the resulting power is positive. That is, the machine produces mechanical power while taking in electrical power (same as in quadrant I). Therefore, this operational mode is reverse motoring.

When the speed command is made to go from negative speed to say zero speed, while SRM 800 is operating in the quadrant III mode of operation, the machine is slowed down by applying a torque that is opposite to what was previously being applied (that is negative). Therefore, a positive torque has to be generated and applied. The torque command goes from negative to positive and the torque becomes positive as soon as the speed is commanded. The torque is positive and the speed is negative at this time, thus producing negative power. That is, the output power is electrical and the input power is mechanical power resulting in the slowing down of the machine. This is the quadrant II operational mode of reverse regeneration.

Figure 15:
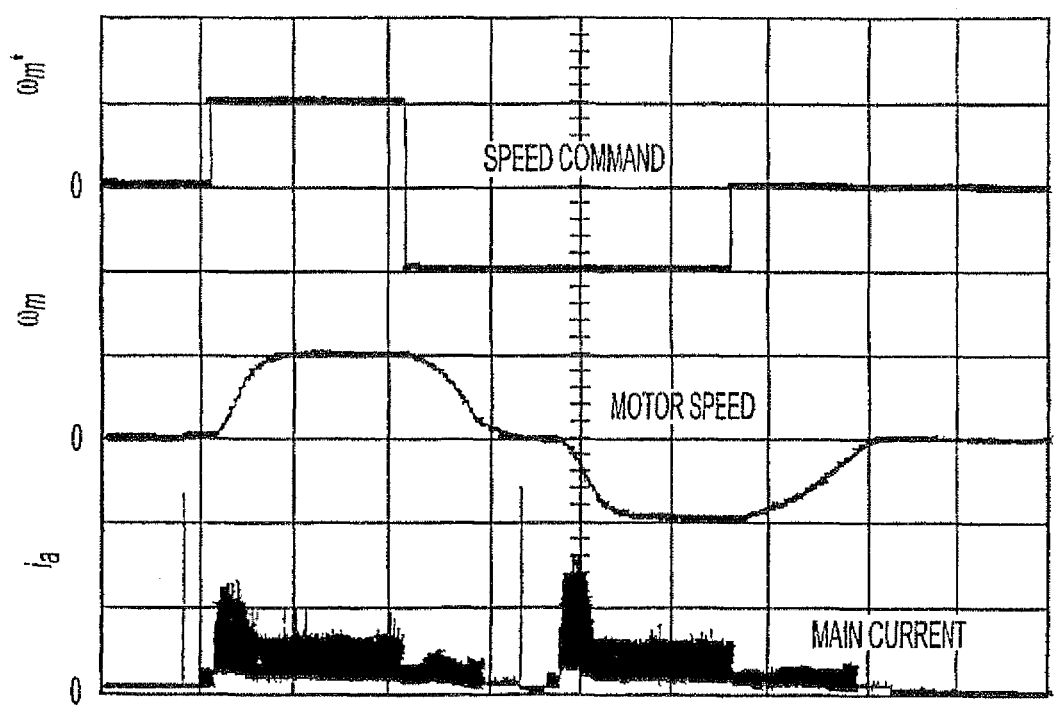
FIG. 15 illustrates the measured experimental results corresponding to the simulation results illustrated in FIG. 14.

FIG. 15 illustrates the measured experimental results corresponding to the simulation results illustrated in FIG. 14. The units of measure for the graphed rotor speed and its command are 5,000 rpm/division, the unit of measure for the current is 10 A/division, and the unit of measure for the time is 5 s/division. As may be determined by comparison of FIGS. 14 and 15, the simulation results correspond closely to the experimental results.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A method of reversing the rotational direction of a two-phase switched reluctance machine (TPSRM) rotor, the method comprising:
   regulating the flow of current through a single controllable current valve to maintain a forward motoring mode of operation for the TPSRM;
   regulating the flow of current through the single controllable current valve to cause the TPSRM's mechanical energy to be converted into electrical energy so as to produce a braking effect on the rotation of the rotor;
   interrupting the flow of current through the single controllable current valve for a period of time; and
   regulating the flow of current through the single controllable current valve, after the period of time has expired, to induce the TPSRM's rotor to reverse its direction of rotation.

2. The method of claim 1 further comprising:
   determining the position of the TPSRM's rotor poles with respect to the TPSRM's stator poles; and
   determining the period of time for interrupting the flow of current through the single controllable current valve in accordance with the determined position of the rotor poles.

3. The method of claim 2, wherein the flow of current through the single controllable current valve remains interrupted until the rotor poles are expected to have rotated more than half way between adjacent stator poles.

4. The method of claim 2, wherein the period of time during which the flow of current through the single controllable current valve is interrupted is no less than the period of time expected for the rotor poles to have rotated more than half way between adjacent stator poles.

5. A system for reversing the rotational direction of a two-phase switched reluctance machine (TPSRM) rotor, the system comprising:
   a controller; and
   a single controllable current valve that regulates, under the control of the controller, the current flowing through the current valve so as to establish the rotational direction and speed of the rotor, wherein:
   the controller and the current valve cooperate to maintain a forward motoring mode of operation for the TPSRM, when the TPSRM's rotor is to continue rotating in its current direction,
   the controller and the current valve cooperate to cause the TPSRM's mechanical energy to be converted into electrical energy so as to produce a braking effect on the rotation of the rotor, when a reversal in the rotor's direction of rotation is to be achieved,
   the controller and the current valve cooperate to interrupt the flow of current through the single controllable current valve for a period of time, after the rotor speed has been reduced by the braking effect, and
   the controller and the current valve cooperate to regulate the flow of current through the single controllable current valve, after the period of time has expired, to induce the TPSRM's rotor to reverse its direction of rotation.

6. The system of claim 5, wherein:
the controller determines the position of the TPSRM's rotor poles with respect to the TPSRM's stator poles; and
the controller determines the period of time for interrupting the flow of current through the single controllable current valve in accordance with the determined position of the rotor poles.

7. The system of claim 6, wherein the flow of current through the single controllable current valve remains interrupted until the rotor poles are expected to have rotated more than half way between adjacent stator poles.

8. The system of claim 6, wherein the period of time during which the flow of current through the single controllable current valve is interrupted is no less than the period of time expected for the rotor poles to have rotated more than half way between adjacent stator poles.

* * * * *